No. 814,647. PATENTED MAR. 6, 1906.
B. M. W. HANSON.
MECHANISM FOR ACTUATING CHUCKS.
APPLICATION FILED JUNE 6, 1903.
5 SHEETS—SHEET 1.
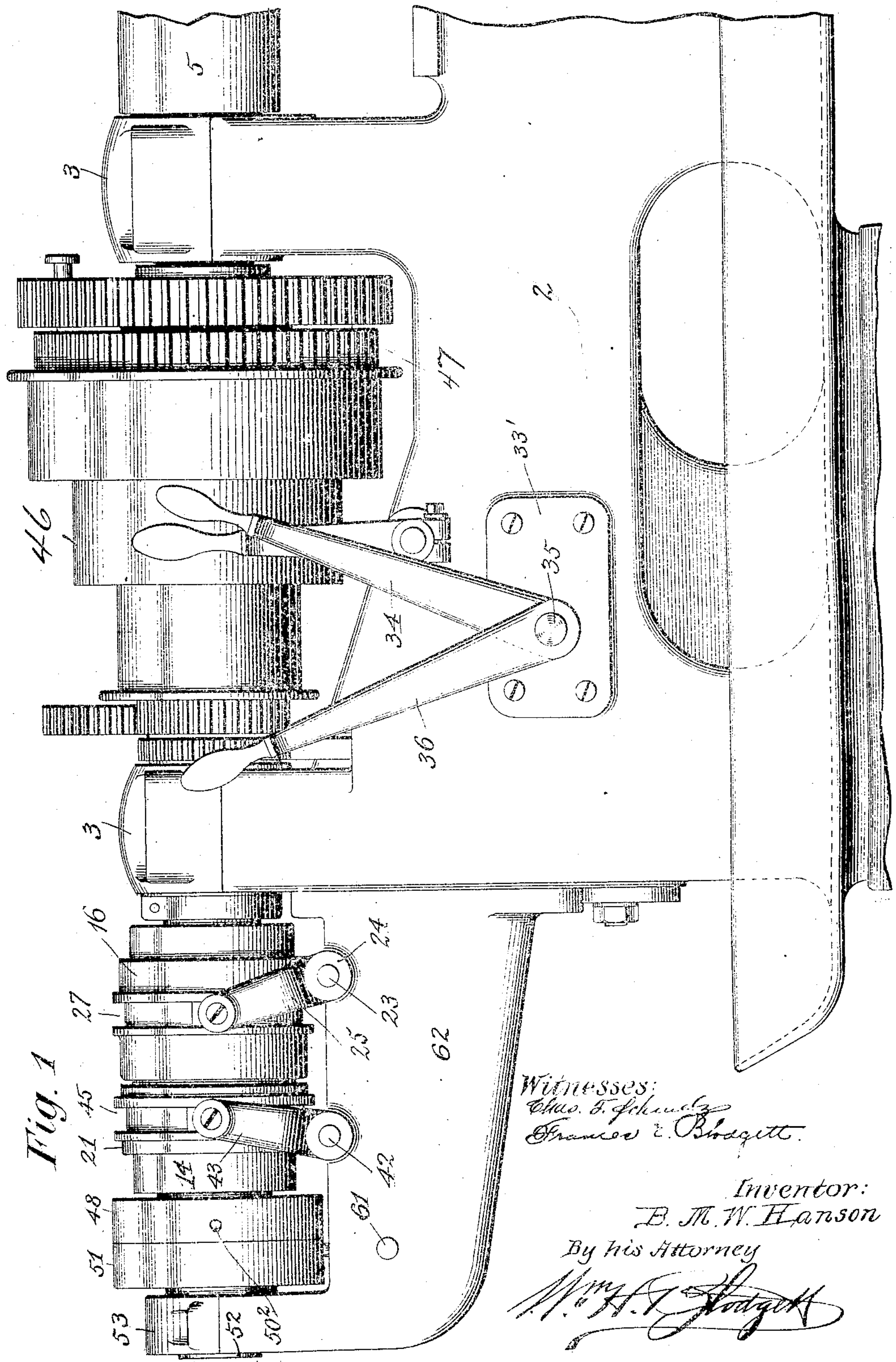

No. 814,647. PATENTED MAR. 6, 1906.
B. M. W. HANSON.
MECHANISM FOR ACTUATING CHUCKS.
APPLICATION FILED JUNE 6, 1903.
5 SHEETS—SHEET 2.
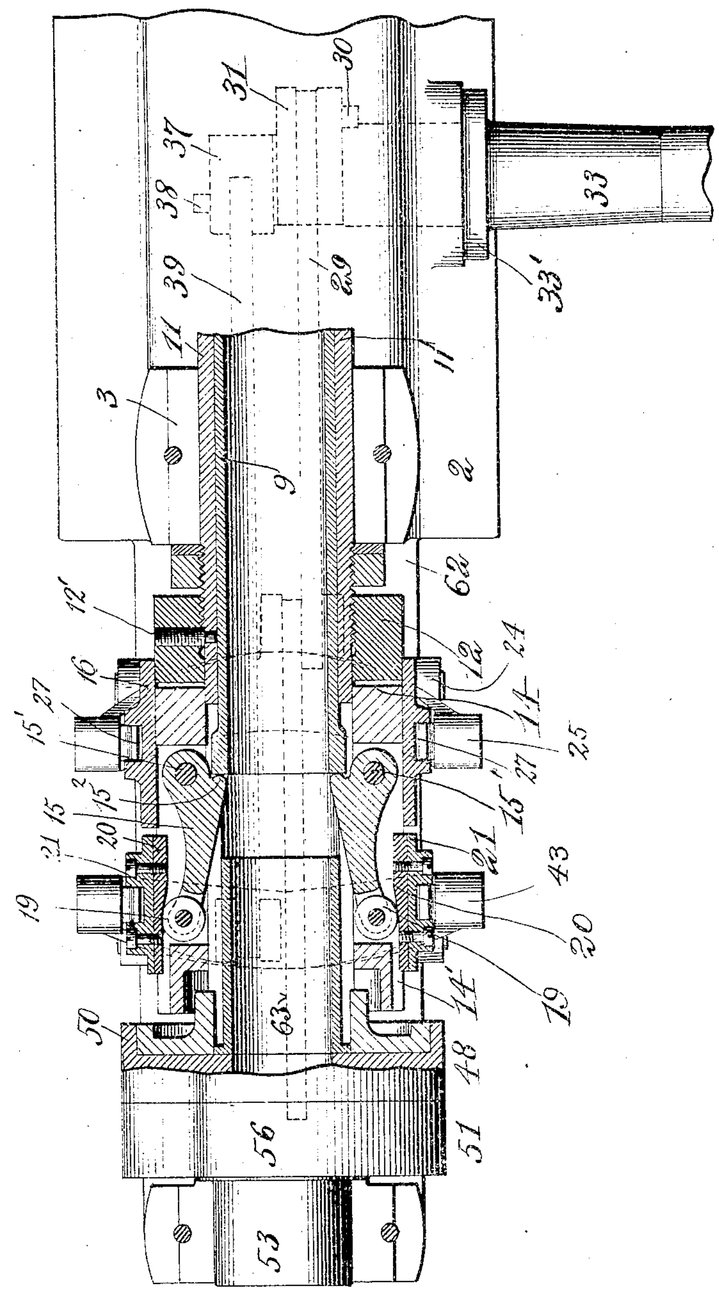
Witnesses:
Chas. F. Schmelz
Frances E. Blodgett
Inventor:
B. M. W. Hanson
By his Attorney
Wm. H. F. Blodgett No. 814,647.
PATENTED MAR. 6, 1906.
B. M. W. HANSON.
MECHANISM FOR ACTUATING CHUCKS.
APPLICATION FILED JUNE 6, 1903.
5 SHEETS—SHEET 3.
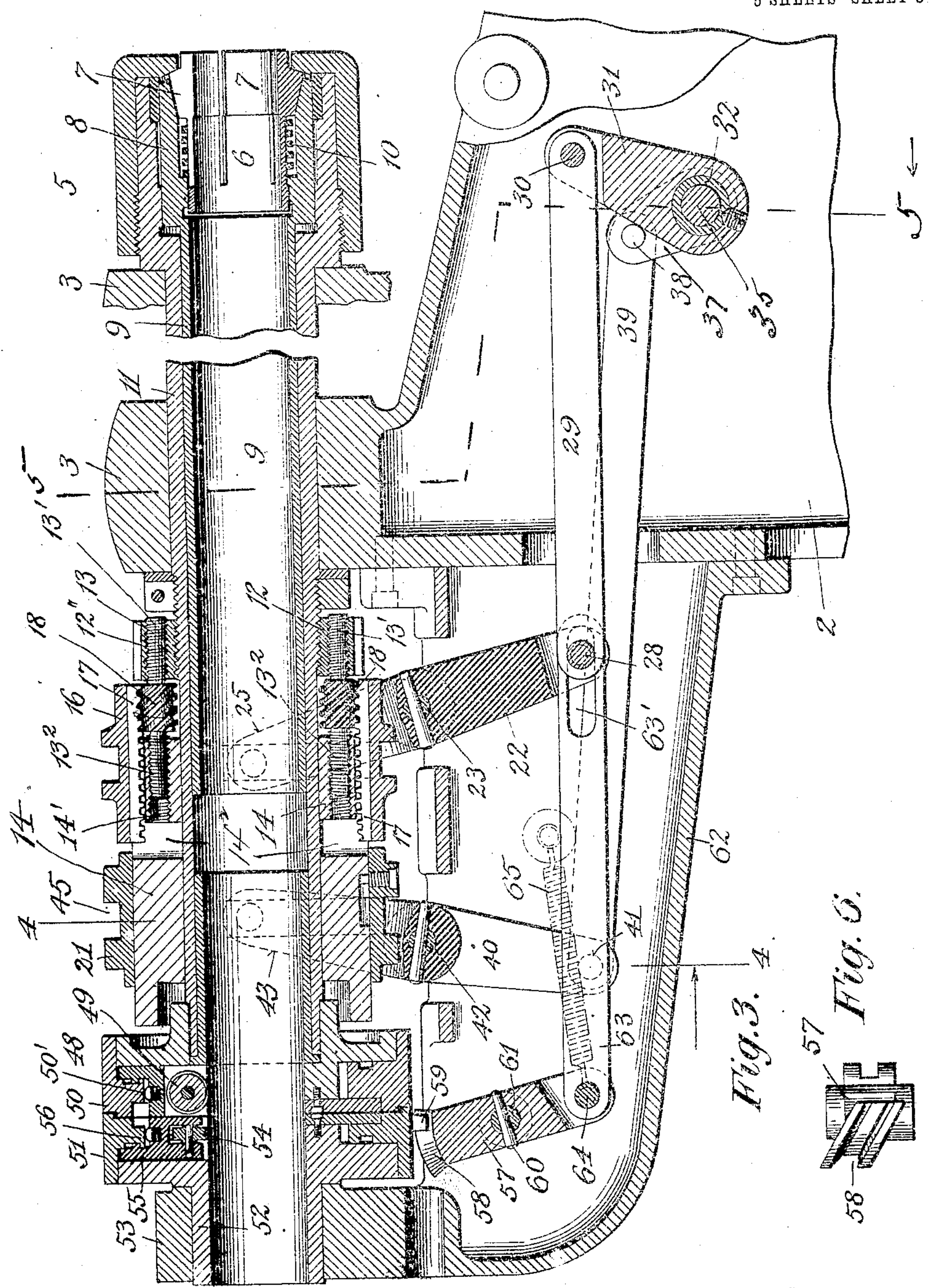
Witnesses
Chas. F. Schmelz
Frances E. Blodgett.
Inventor:
B. M. W. Hanson
By his Attorney
Wm. H. L. Blodgett No. 814,647. PATENTED MAR. 6, 1906.
B. M. W. HANSON.
MECHANISM FOR ACTUATING CHUCKS.
APPLICATION FILED JUNE 6, 1903.
5 SHEETS—SHEET 4.
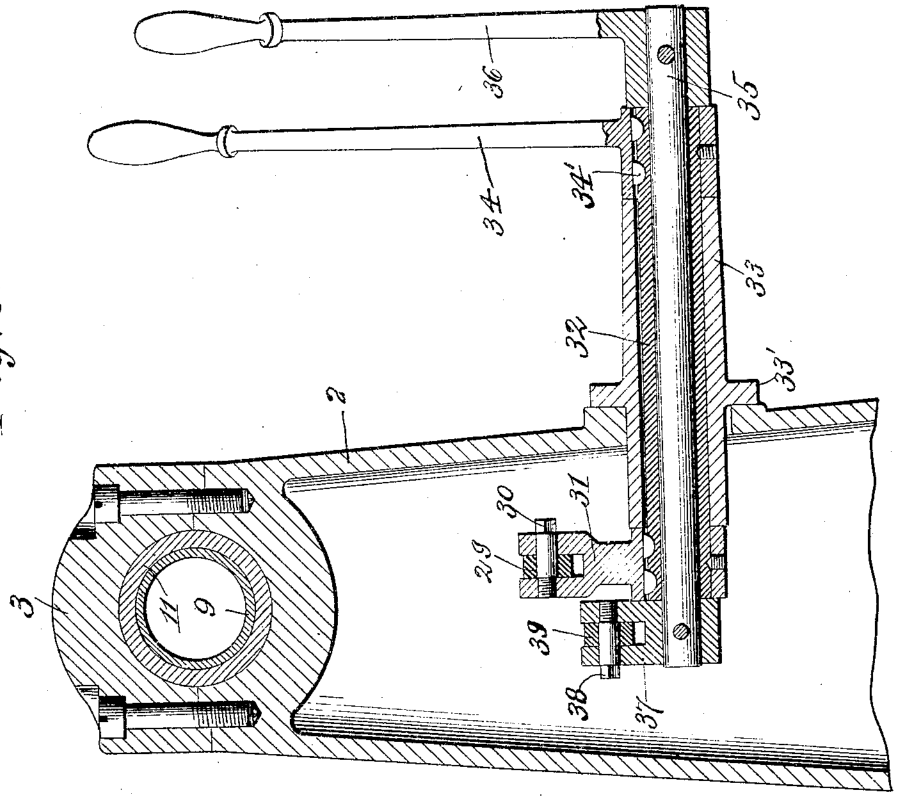
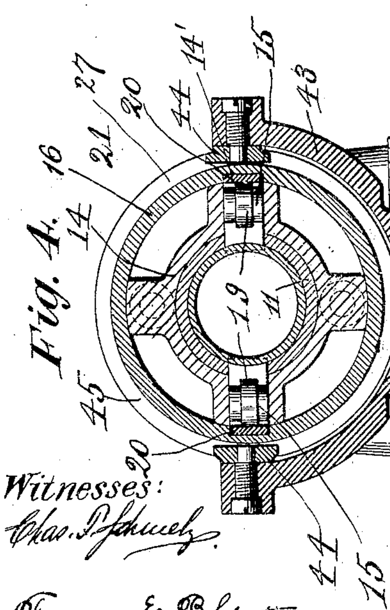
Witnesses:
Chas. F. Schmelz
Francis E. Blodgett
Inventor:
B. M. W. Hanson
By his Attorney
Wm. H. F. Blodgett No. 814,647. PATENTED MAR. 6, 1906.
B. M. W. HANSON.
MECHANISM FOR ACTUATING CHUCKS.
APPLICATION FILED JUNE 6, 1903.
5 SHEETS—SHEET 5.
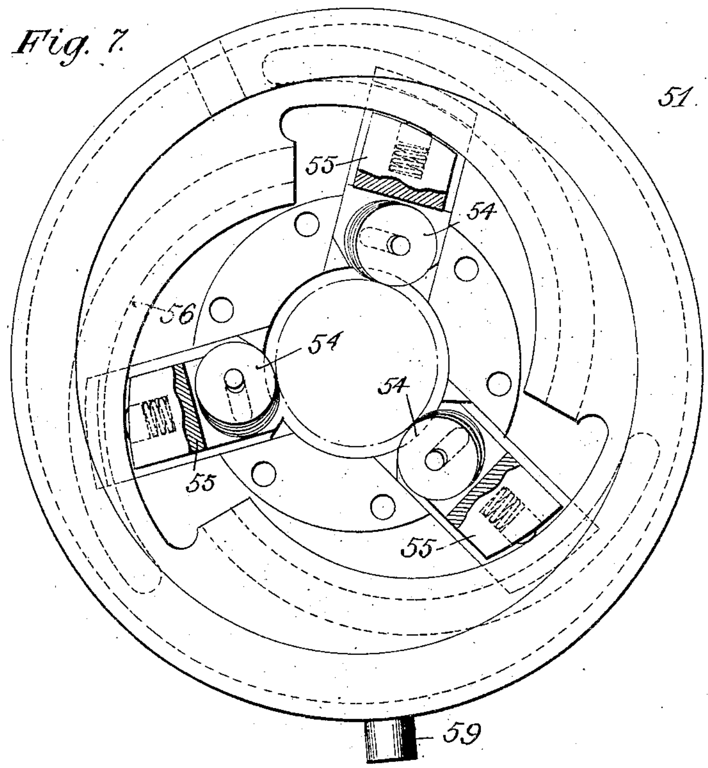
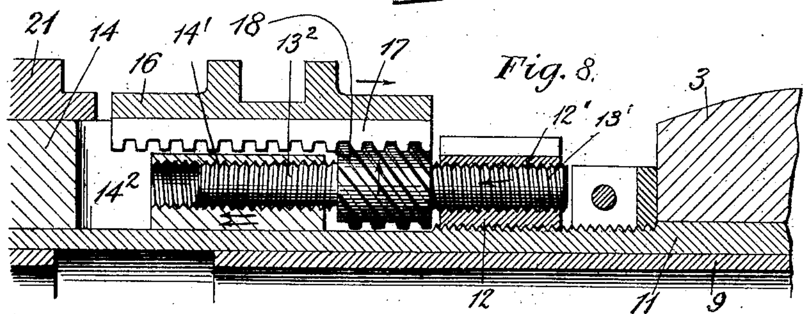
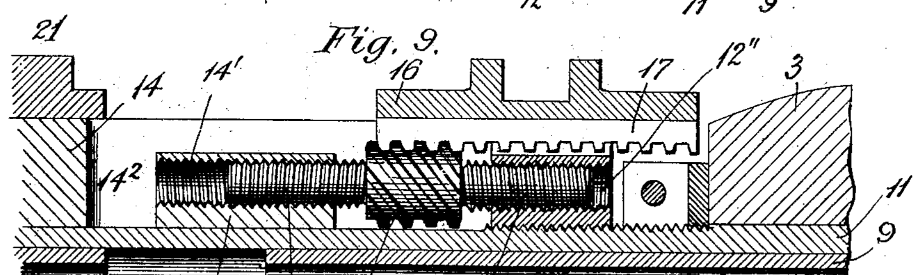
Witnesses:
Chas. F. Schmelz
Frances E. Blodgett.
Inventor:
B. M. W. Hanson,
By his Attorney
Wm. H. Blodgett

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

MECHANISM FOR ACTUATING CHUCKS.

No. 814,647. Specification of Letters Patent. Patented March 6, 1906.

Application filed June 6, 1903. Serial No. 160,355.

*To all whom it may concern:*

Be it known that I, BENGT M. W. HANSON, a citizen of Sweden, and a resident of Hartford, in the county of Hartford and State of Connecticut, have invented certain new and useful Improvements in Mechanism for Actuating Chucks, of which the following is a specification.

This invention relates to mechanism for actuating chucks, especially for metal-working machines in which stock is to be operated upon by a cutting-tool or similar device, although it is not limited to any specific use.

One of the main objects of the invention is the provision, in connection with a chuck, of means for imparting a series of closing impulses to said chuck, whereby the stock will first be gripped and then a final powerful clamping movement will be given the chuck-jaws to cause them to clamp firmly stock of any diameter within the capacity of the machine, as will be hereinafter explained.

A further object of the invention is the provision of means whereby the chuck-operating device may be operated by independent instrumentalities, neither of which interferes with the other, although both are coöperative in effect upon the chuck-jaws.

Further objects of the invention are the provision of chuck-operating devices of peculiar construction and of coöperating stock-feed mechanism, as will be hereinafter described.

In the accompanying drawings, Figure 1 represents a side view of a head portion of a machine to which my invention may be applied. Fig. 2 is a central horizontal section on the line of the main spindle. Fig. 3 is a central vertical section of said machine. Fig. 4 is a section on line 4 4 of Fig. 3. Fig. 5 is a transverse section on line 5 5 of Fig. 3. Fig. 6 is a detail view hereinafter described. Fig. 7 is a side view of roller-feed mechanism for feeding the stock. Fig. 8 shows a portion of the chuck-actuating device on an enlarged scale, and Fig. 9 is a similar view showing the parts shifted to open the chuck.

Like numerals designate similar parts throughout the several views.

In carrying my invention into practice it is to be understood that it is not limited to any particular organization or construction of the chuck. In the present instance there is shown for illustrative purposes a chuck which is designated in a general way by the numeral 5 and comprises a collet 6, having jaws 7, the outer surfaces of which are tapered to conform to the similarly-shaped bore of a head 8, shown as rigid with a sleeve 9, the forward movement of which will result in forcing said jaws to clamp the work. Means are provided whereby the sleeve 9 may be moved rearward, and these means comprise in the form shown a spring 10, encircling the collet 6, as shown in Fig. 3. Said sleeve 9 is mounted for longitudinal movement relatively to a main spindle 11, in which it is fitted, and the spindle is journaled in bearings 3 3 of the machine-frame 2, so that the work which is clamped by the chuck 5 will be rotated by the spindle.

As above mentioned, my invention comprises devices whereby the jaws of a chuck are first closed upon the work and are then given a final clamping action thereon, and these devices may be of any suitable kind. In the present instance a collar 12 is mounted on and is preferably in screw-threaded engagement with the spindle 11, although it may be integral therewith, if desired, and said collar is locked by a screw 12′, as shown in Fig. 2. Entering nuts 12″ of said collar at points substantially opposite each other are screws 13, having right-hand threads 13′ at one end and left-hand threads $13^2$ at the opposite end. These left-hand threads $13^2$ engage with nuts 14′ of a sleeve 14, mounted for sliding movement on the spindle 11, and levers 15 for operating the chuck-actuating sleeve 9 are pivoted at 15′ to the sleeve 14, as shown in Fig. 2. On its outer surface the sleeve 14 is preferably cylindrical, and it carries at its forward end a collar 16, provided with racks 17 in engagement with spiral gears 18, so that as the collar 16 is moved longitudinally on the sleeve 14 the gears 18 will be rotated, and with them the screws 13, having right and left hand sections 13′ and $13^2$. This results in moving the sleeve 14 toward or away from the collar 12, according to the direction in which the collar 16 is actuated. As shown in Fig. 2, levers 15 are provided adjacent to their pivots with projections $15^2$, engaging the end of the chuck-actuating sleeve 9.

From the above description it will be understood that when the sleeve 14 is actuated toward the right the projecting abutments 15[2] of levers 15 will cause a longitudinal movement of the sleeve 9, said movement resulting in preliminarily closing the chuck-jaws, and inasmuch as the leverage applied to the collar 16 may not be sufficient to cause said jaws to secure the work firmly and clamp stock of different diameters means are provided whereby an additional forward impulse may be imparted to said sleeve 9, as will be presently explained. At their free ends the levers 15 carry rollers 19 in engagement with cam-plates 20, secured to the inner surface of a sleeve 21, and said cam-plates are fitted in grooves 14′ of sleeve 14 and serve as splines for maintaining relationship between the two sleeves.

Means are provided for operating the collar 16 and sleeve 21 independently of each other, said means comprising for collar 16 a lever 22, carried by a rock-shaft 23, mounted in bearings 24 of the frame, said lever having a fork 25 fitted in a groove 27 of the collar 16. In the lower end of lever 22 of fork 25 is a stud 28, connected by a link 29 with a pin 30, secured in an arm 31, which is mounted for movement with a sleeve 32, journaled in a tubular bearing 33 of the frame, said bearing being provided with a flange 33′ for limiting its position. At the other end sleeve 32 is provided with a hand-lever 34, whereby said sleeve may be rocked to shift the collar 16 upon the sleeve 14 when required.

Mounted for movement within the sleeve 32 is a shaft 35, the outer end of which carries a lever 36, and upon the inner extremity of said shaft is secured a forked arm 37, connected by a pin 38 to a link 39, the inner end of which is attached to a lever 40 by a pin 41, said lever being secured to a rock-shaft 42, having a fork 43, provided with shoes 44, fitted in a groove 45 of the sleeve 21.

Any suitable mechanism may be employed for advancing stock to and through the chuck until the proper gaged length projects therefrom; but I have shown for this purpose what is termed "roller feed mechanism" of the type described in my Patent No. 711,851, dated October 21, 1902. Referring now to this mechanism, 48 designates in a general way a chuck carried by the spindle 11, and this chuck is equipped with rollers 49, having peripheries shaped to engage and rotate the stock, the outer ring 50 being provided with cam-surfaces 50′ for advancing and withdrawing said rollers and the said ring having an opening 50[2], in which a tool may be inserted when it is desired to turn the ring to adjust the rollers, all as in the patent aforesaid.

Designated generally by 51 is the feed-chuck proper, and it has a hub 52 fixedly secured in a bearing 53 of the frame and is equipped with a series of obliquely-disposed rollers 54, which are journaled in blocks 55, movable toward and from the work by the cam-ring 56 of the chuck, as in the patent aforesaid. In this chuck it is important that the obliquely-disposed feed-rollers should be withdrawn from the stock when the jaws of chuck 6 are closed and that said feed-rollers should be forced to engage the stock when the chuck-jaws are open, and I accomplish these results in the following manner: Designated by 57 is a lever having a cam-groove 58 in one end for the reception of a pin or lug 59, projecting from the cam-ring 56 of the feed-chuck 51, and this lever is secured by a pin 60 or otherwise to a rock-shaft 61, journaled in bearings of an extension 62 of the frame 2, and is bifurcated at its lower end to receive the end of a link 63, secured in position by a pin 64. A spring 65, connected to the pin 64 and to the frame, normally tends to throw the lever 57 to the position illustrated in Fig. 3, thereby causing the cam 58 of said lever to actuate the ring 56 and shift the blocks in which the feed-rollers are journaled away from the stock. A slot 63′ is formed in the inner end of link 63 to enable said link to move within limits upon the pin 28 of lever 22, as shown in Fig. 3.

When it is desired to start the feed mechanism, the hand-lever 34 is grasped and shifted to the left, thereby rocking arm 31 in the same direction and causing the link 29 to push lever 22 and throw the fork 25 to the right, thus moving the collar 16 and its racks also to the right and rotating the spiral gears 18 and their right-and-left screws 13 13[2] in such direction that the sleeve 14 will be forced back to carry the shoulders 15[2] of levers 15 away from the end of the chuck-actuating sleeve 9 and permit said sleeve 9 to be driven rearward by spring 10 and the chuck 6 to open to the position shown in Fig. 3. As lever 22 moves to the left the pin 28 first travels along the slot 63′ of link 63 without actuating said link and the cam-lever 57 to which it is attached; but the chuck 6 having opened finally engages the end wall of said slot, shifts said link to the left, and rocks the cam-lever against the action of spring 65, and whose cam 58, in engagement with pin 59, throws the cam-ring 56 to a position to close the obliquely-disposed feed-rollers upon the rapidly-rotating stock, which will now be advanced through the chuck to the desired extent. A reverse movement of the lever 34 to the position shown will of course cause the cam-lever 57 to be immediately shifted in the opposite direction to stop the feed, and this will occur just prior to the preliminary closing of the chuck 6 upon the stock by the instrumentalities described when said lever 34 is forced to the right.

My improved mechanism operates as follows: Power is applied to the main spindle 11 by a belt upon the driving-cone 46, usual back gearing connecting said cone with the spindle. After stock has been fed forward through the chuck 48, the sleeve 9, and chuck 6 to cause its end to project beyond said chuck 6 for the required distance the hand-lever 34, the hub of which is keyed at 34′ to sleeve 32, is rocked to the position shown in Fig. 1, thus through the connections described actuating the collar 16 toward the left and causing the racks 17 of said collar, which slide in slots $14^2$ of sleeve 14 and prevent the collar from rotating, to turn the spiral gears 18 and through the right and left hand screws 13′ and $13^2$ force sleeve 14 to the right. (See Figs. 1 and 8.) Inasmuch as the projections $15^2$ of levers 15, pivoted in sleeve 14, are in engagement with the end of the sleeve 9, it follows that said sleeve 9 will also be forced toward the right, so that the inner tapered wall of the head 8 thereof will become effective in contracting the chuck-jaws 7 to close the same against the work with a preliminary clamping action, and said work being now firmly held in position further longitudinal movement may be given to the sleeve 9, while the sleeve 14 is stationary, and this is accomplished by actuating the sleeve 21. In bringing this part of the invention into action the lever 36 is grasped and pulled from the position shown in Fig. 1 toward the right, thus actuating the shaft 35 and its arm 37 and the link 39 in the same direction and swinging the lever 40 and its fork 43, the latter moving the sleeve 21, carrying the cam-plates 20, toward the left, causing said cam-plates to become effective in rocking the levers 15 around their pivots 15′ to throw the free ends thereof toward the axis of the spindle a distance determined by the shape of said cam-plates 20, and thereby imparting a powerful auxiliary thrust to the sleeve 9 and jaw-actuator 8, the latter forcing the chuck-jaws firmly into contact with the stock, and thus causing them to firmly secure stock of different diameters. As will be obvious, the right-hand threads 13′ will move in or out of the nuts in collar 12, rigid with the spindle, according to the direction in which the screws are turned, and this will result in an endwise travel of the screws 13 and their spiral gears 18, and inasmuch as the left-hand threads $13^2$ are simultaneously turning in the nuts 14′ of sleeve 14 it will be seen that said sleeve will be actuated with multiplied speed in its movements on the spindle toward and from the stock-chuck, the reverse position of the actuating screw and sleeve being shown in Fig. 9.

Stock often varies in diameter throughout its length, and therefore it has been a problem how to secure it firmly by the chuck. With the ordinary machine the tails or free ends of the toggle-levers in contact with the chuck-actuator sleeve frequently flex or bend under the pressure applied to them and the chuck-jaws are not forced into firm contact with the stock. In my invention on the forward movement of sleeve 14 the projections $15^2$ of toggle-levers 15 advance the chuck-actuator and cause it preliminarily to close the chuck upon the stock, and if the part of said stock within the chuck should be of standard diameter the chuck-jaws will of course grasp it. If, however, said part of the stock should be of less diameter than standard, then the additional impulse applied to the sleeve 9 by levers 15 when operated by the cam-plates 20 will cause the chuck-jaws to move farther inward and to engage and firmly clamp said stock. Stock varying in diameter may therefore be firmly secured in the chuck by simple mechanism, and the clamping action of the chuck will not be affected by variations of diameter of various portions of the stock bar or rod. In this way the problem of firmly securing stock of varying diameter by one and the same chuck has been solved, and means for accomplishing this result constitute one of the salient features of my invention.

In mechanism in which pivoted levers operated by a sliding cone are employed centrifugal force due to the rapidly-rotating spindle has a tendency to throw the ends of the levers outward, and thus prevent the withdrawal of the chuck-actuating sleeve at times when the chuck should open to permit a new feed. In the present construction the levers 15 are prevented from outward movement by centrifugal force to release the chuck by the sleeve 21, and consequently the chuck-actuating sleeve 9 is kept under perfect control, and the chuck can either be closed or permitted to open without derangement in timing of either of said functions. Furthermore, in my improved machine a series of closing movements may be imparted to the chuck, the chuck will open and the feed mechanism will operate while the spindle is rotating, thereby dispensing with the necessity of stopping the machine to impart an additional clamping impulse to said chuck.

Either chuck-closing mechanism may be used independently of the other, if desired, the invention not being limited to their conjoint employment. In other words, the mechanism for preliminarily closing the chuck may sometimes be relied upon, if desired.

While particular mechanism is shown and described for imparting two clamping impulses to the chuck-jaws, it is distinctly to be understood that my invention is not limited in this respect. So, too, any suitable feed mechanism may be substituted for that shown, if desired, and changes may be made in the form, proportions, and location of the parts, the invention not being limited to the construction described. Again, the independent mechanisms for imparting primary and secondary closing movements to the chuck may be operated automatically, if desired, the invention not being limited to the manual devices shown.

Having thus described my invention, what I claim is—

1. The combination, with a spindle, and its chuck, of a sleeve surrounding the spindle; means for actuating said sleeve; a chuck-actuator; devices carried by the sleeve for imparting a preliminary movement to the chuck-actuator to close the chuck-jaws; a second sleeve movable on the first-named sleeve; means carried by said second sleeve for imparting an additional movement to said devices to cause the chuck-actuator forcibly to compress said chuck-jaws upon the stock; and means independent of those for operating the first sleeve for actuating said second sleeve.

2. The combination, with a spindle and its chuck, of a sleeve movable on said spindle; mechanism for independently actuating said sleeve; means controlled by said sleeve for preliminarily closing the chuck; a second sleeve movable on the first sleeve; means controlled by the second sleeve for imparting a final closing movement to said chuck; and devices independent of those for operating the first sleeve for actuating said second sleeve.

3. The combination, with a spindle and its chuck, of a right-and-left screw; a device rigid with the spindle, and into which one section of said screw is threaded; means for actuating said screw; and means actuated by the screw for closing the chuck.

4. The combination, with a tubular spindle, of a chuck carried by the spindle; a chuck-closing device within the spindle; a sleeve carried by the spindle; means actuated by said sleeve for imparting a preliminary closing movement to said chuck-closing device while the spindle is in rotation; and a second sleeve movable on the other sleeve for actuating said means and imparting a final closing movement to said chuck-closing device while the spindle is in rotation, and means independent of those for actuating the first sleeve for operating said second sleeve.

5. The combination, with a tubular spindle, and with a chuck carried by said spindle, said chuck being composed of jaws having conical outer surfaces, of a chuck-actuator having a head shaped to engage the outer surfaces of said jaws; a sleeve movable upon the spindle, and having threaded seats; a collar on the spindle, and also having threaded seats of reverse pitch to those of the sleeve; right-and-left screws for engaging the seats in said collar and sleeve; means for actuating said screws; and devices carried by the sleeve, and having parts in engagement with the chuck-actuator.

6. The combination, with a tubular spindle, of a chuck carried by said spindle; a chuck-actuator within the spindle; a slotted sleeve movable upon the spindle; levers pivoted to said sleeve and working in the slots thereof, said levers having projections in engagement with the chuck-actuator; and a second sleeve movable upon the first-named sleeve, and having cam-plates extending into the slots of said first-named sleeve and engaging said levers.

7. The combination, with a tubular spindle, of chuck-jaws having conical peripheries; a chuck-actuator within the spindle, and having a head conforming on its inner side to the peripheries of said jaws; a sleeve slidable upon the spindle; nuts on said sleeve; right-and-left screws for actuating said sleeve; nuts carried by the spindle; gearing for actuating the screws; and devices carried by the sleeve and in contact with the end of the chuck-actuator.

8. The combination, with a tubular spindle and its chuck, of a chuck-actuator; a slotted sleeve movable upon the spindle; means for actuating said slotted sleeve; levers pivoted in the slots of the sleeve, and having projections adapted to engage the rear end of the chuck-actuator; a second sleeve movable upon the first-named sleeve; cam-plates on the inner side of said second sleeve projecting into the slots of the slotted sleeve, and serving to lock the same against independent rotation on the first sleeve, said cam-plates acting against the rear ends of the pivoted levers; and means for actuating said second sleeve.

9. The combination, with a tubular spindle having a head, of chuck-jaws mounted in said head; a chuck-actuator; a sleeve surrounding and movable upon the spindle; a collar rigid with the spindle; right-and-left screws working in the sleeve and collar; gearing for actuating said screws; and means carried by the sleeve for operating the chuck-actuator.

10. The combination, with a tubular spindle, of a chuck carried by said spindle; a sleeve within the spindle, and having a portion shaped to actuate the chuck; a sliding sleeve upon the spindle; means carried by the sliding sleeve for engaging the chuck-actuating sleeve; a screw engaging a nut in the sliding sleeve; relatively fixed device engaged by the screw; a gear carried by the screw; and means for actuating said gear.

11. The combination, with a tubular spindle, of a chuck carried by said spindle; a sleeve within the spindle, and having a head for actuating the chuck; a sliding sleeve upon the spindle; means carried by the sliding sleeve for engaging the chuck-actuating sleeve; a right and left hand screw having an intermediate gear; a device carried by the spindle and having a nut for engaging one section of said screw; a nut in the sliding sleeve for engaging the other section of said screw; and means for rotating said gear.

12. The combination, with a tubular spindle, of a chuck mounted within a head of said spindle; a chuck-actuating sleeve mounted within the spindle, and having a head shaped to engage and contract the chuck-jaws; a sliding sleeve upon the spindle, said sleeve having a nut; means carried by the sliding sleeve for engaging the chuck-actuating sleeve; a collar on the spindle having a nut; a right and left hand screw having an intermediate gear; a rack for actuating said intermediate gear; and means for reciprocating the rack.

13. The combination, with a rotary spindle and its chuck, of a chuck-actuator; a collar secured to the spindle and having a nut; a screw engaging the nut; a sleeve operated by the screw; means for rotating the screw; and means on the sleeve for engaging the chuck-actuator.

14. The combination, with a spindle and its chuck, of a chuck-actuator; a sleeve on the spindle; levers pivoted to said sleeve, and having parts in engagement with the chuck-actuator; means for actuating the sleeve; a second sleeve mounted for sliding movement on, and rotation with, the other sleeve, means for actuating said second sleeve; and cam-plates carried by the second sleeve for operating the pivoted levers, said cam-plates working in grooves of the first sleeve.

15. The combination, with a tubular spindle, and a chuck supported in a head thereof, of a sleeve having a chuck-actuator, said sleeve being mounted in the spindle; a collar rigid with the sleeve and having a pair of nuts; a sleeve loose upon the spindle, and having nuts of reverse pitch to those of said collar; a pair of right-and-left screws, each having a gear; means carried by the sleeve loose on the spindle for engaging the sleeve within the spindle; and means for engaging said gears and thereby rotating the screws.

16. The combination, with a tubular spindle and a chuck supported in a head thereof, of a sleeve within the spindle; a chuck-actuator rigid with said sleeve; a device rigid with the spindle, and having a nut; a sleeve loose upon the spindle, and having a nut of reverse pitch to that of said device; means on said sleeve for engaging the inner sleeve; a right and left hand screw engaging said nuts, and having an intermediate gear; a rack for rotating said gear; and means for actuating the rack.

17. The combination, with a tubular spindle having a head, of a sleeve within said spindle and carrying a chuck-actuator, a chuck within the spindle-head; a collar secured to the spindle, and having nuts; a sleeve slidable upon the spindle, and having nuts of reverse pitch to those of the collar; means carried by the slidable sleeve and bearing against the sleeve carrying the chuck-actuator; right and left hand screws in engagement with the nuts of said slidable sleeve and said collar; a spiral gear on each screw intermediate the reversely-pitched parts thereof; racks for rotating said spiral gears; and means for actuating said racks.

18. The combination, with a tubular spindle, of a chuck carried by said spindle; a sleeve within the spindle; a chuck-actuator carried by the sleeve; a collar on the spindle, said collar having a nut; a sleeve slidable upon the spindle and having a nut of reverse pitch to that of the collar; means for engaging said sleeve with the sleeve in the spindle; a screw having right and left hand threads engaging said nuts, and a spiral gear intermediate said threads; a rack in mesh with said spiral gear; and means for actuating the rack.

19. The combination, with a tubular spindle, of a chuck carried by said spindle; a sleeve within the spindle; a chuck-actuator carried by the sleeve; a collar on the spindle, and having nuts; a sleeve slidable on the spindle, and provided with nuts reverse in pitch to those of the collar; screws having right-and-left sections in engagement with the nuts, and spiral gears intermediate said sections; racks for actuating said spiral gears; a carrier for the racks; and means for actuating said carrier.

20. The combination, with a tubular spindle, of a chuck carried by said spindle; means for actuating the chuck; a collar on the spindle, said collar having a nut; a slidable device, constituting a part of the chuck-actuating means, and having a nut of reverse pitch to that of the collar; a screw having right-and-left sections in engagement with said nuts, and a gear intermediate said sections; a rack in engagement with said gear; a carrier for the rack; a lever connected to said carrier; and means for actuating the lever.

21. The combination, with a spindle, and with a chuck carried thereby, of a chuck-actuator within the spindle; a sleeve surrounding the spindle; means carried by the sleeve and in engagement with the chuck-actuator; a collar on the spindle, said collar having oppositely-disposed nuts; oppositely-disposed nuts reverse in pitch to those of the collar in the sleeve upon the spindle; right and left hand screws engaging said nuts; gears carried by said screws; a sliding collar upon the sleeve; racks carried by said collar, and in engagement with the gears of the screws; and means for actuating the rack-carrying collar.

22. The combination, with a tubular spindle having a head, of a sleeve within said spindle, and having a head with an inclined, inner surface; a chuck, the jaws of which have conical peripheries; a sleeve fitted for sliding movement on the spindle; means carried by the sleeve for imparting forward movement to the sleeve within the spindle; right and left hand screws in engagement with nuts carried by the spindle and by the sleeve movable thereon; spiral gears on said screws; racks in engagement with said spiral gears; a collar movable upon the sleeve surrounding the spindle; a lever for actuating said collar; and lever-and-link mechanism for operating the lever.

23. The combination, with a spindle, of a chuck carried by said spindle; a chuck-actuator within the spindle; a sliding sleeve surrounding the spindle; levers pivoted within the sleeve and having projections for engaging the chuck-actuator; a second sleeve surrounding the other sleeve; cam-plates carried by said second sleeve, and in engagement with the free ends of said pivoted levers; mechanism for sliding the primary sleeve upon the spindle to impart a preliminary movement to the chuck-actuator; and means for independently actuating the second sleeve to cause the levers to impart a final movement to said chuck-actuator.

24. The combination, with a tubular spindle, and its chuck, of a chuck-actuating sleeve within the spindle, and having a head to engage said chuck; a sleeve surrounding the spindle, and having internal threads at its forward end; means on said sleeve for engaging the chuck-actuating sleeve; a collar on the spindle having internal threads reverse in pitch to those of the sleeve upon the spindle; a right-and-left screw engaging the threads of said sleeve and said collar; a spiral gear carried by said screw; a collar surrounding the sleeve on the spindle; a rack on the collar and in engagement with said spiral gear; a fork for reciprocating the collar; and means for actuating the fork.

25. The combination, with a tubular spindle, of a sleeve within said spindle; a chuck carried by the spindle, and actuated by a part of the sleeve; a sleeve surrounding the spindle and having internal threads; a collar on the spindle having internal threads of reverse pitch to those of the sleeve; right-and-left screws engaging the threads of said sleeve and collar; spiral gears rigid with said screws; devices carried by the sleeve on the spindle for engaging the sleeve within the same; a collar surrounding the sleeve on the spindle; racks carried by the collar, and in mesh with the spiral gears of the screws; and lever-and-link mechanism for actuating the rack-carrying collar.

26. The combination, with a tubular spindle having a head, of a sleeve within the spindle, and having a head with an inclined, inner surface; a chuck having an inclined peripheral surface; a sleeve slidable upon the spindle; levers pivoted to said sleeve, and having projections in engagement with the end of the inner sleeve; mechanism for reciprocating the sleeve upon the spindle; a sleeve surrounding said sleeve upon the spindle; cam-plates carried by the surrounding sleeve, and in engagement with the free ends of the pivoted levers; a fork having projections fitted in a groove of the surrounding sleeve; a lever for actuating said fork; a link connected at one end to the lever; a rock-arm to which said link is also connected; and means for actuating said rock-arm.

27. The combination, with a tubular spindle and its chuck, of an inner sleeve having a head for actuating the chuck; a sleeve surrounding the spindle, and having nuts; levers pivoted to said sleeve and in engagement with the end of the inner sleeve; a collar secured to the spindle and having nuts of reverse pitch to those of the outer sleeve; right and left hand screws in engagement with the nuts of the sleeve and collar; spiral gears carried by said screws; a collar on the outer sleeve; racks on said collar, and in mesh with the spiral gears; a pivoted fork for reciprocating the collar; a link connected to an arm of said fork; a rock-arm; and means for actuating said rock-arm.

28. In mechanism of the class described, the combination, with a tubular spindle, of a sleeve within said spindle; a chuck adapted to be actuated by a part of said sleeve; an outer sleeve having nuts; pivoted levers carried by said outer sleeve, and having projections in engagement with the inner sleeve; a collar secured to the spindle, and having nuts of a pitch reverse to those of said outer sleeve; right and left hand screws engaging the nuts of the outer sleeve and collar; spiral gears carried by said screws; a rack-carrier upon the outer sleeve; racks supported by said carrier, and in mesh with the spiral gears; a fork for reciprocating the rack-carrier; lever-and-link mechanism for actuating the fork; a second sleeve movable on said outer sleeve; cam-plates carried by said second sleeve, and in engagement with the free ends of the pivoted levers; a fork for reciprocating said second sleeve; and lever-and-link mechanism for actuating said fork.

In testimony whereof I affix my signature in presence of two witnesses.

BENGT M. W. HANSON.

Witnesses:
N. S. Bates,
Kath. T. M. O'Connell.